May 26, 1953     F. M. YOUNG     2,639,899
AUTOMOBILE RADIATOR
Filed June 18, 1948
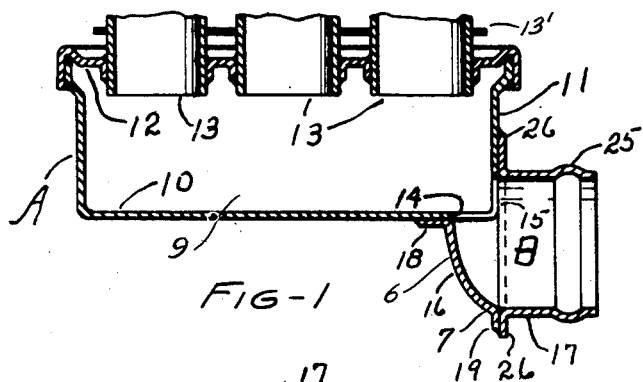
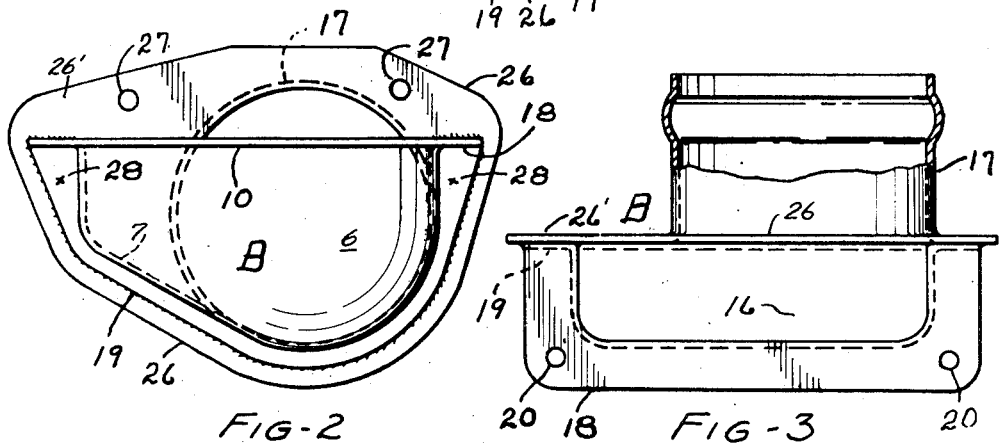
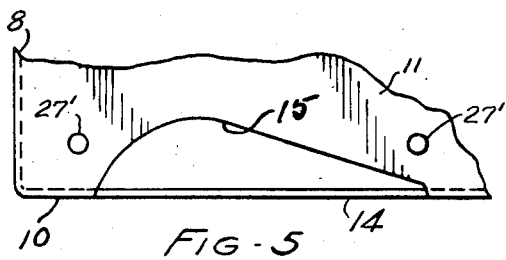
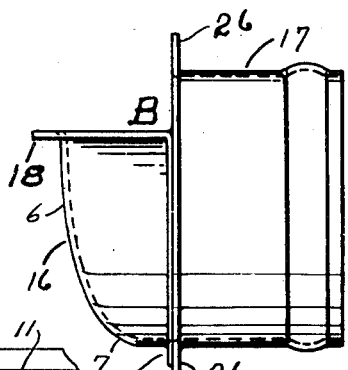
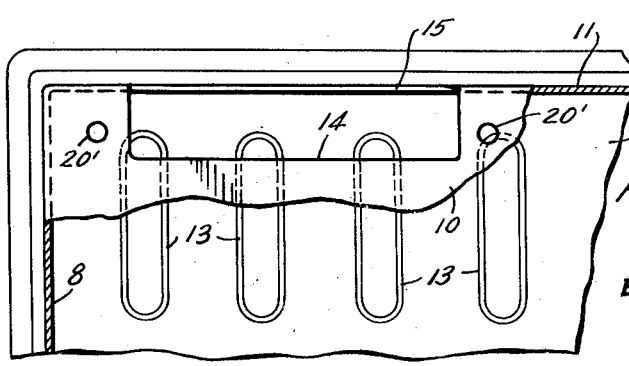
INVENTOR.
FRED M. YOUNG
BY A. S. Knott
ATTORNEY Patented May 26, 1953

2,639,899

UNITED STATES PATENT OFFICE 2,639,899

AUTOMOBILE RADIATOR

Fred M. Young, Racine, Wis., assignor to Young Radiator Company, Racine, Wis., a company of Wisconsin Application June 18, 1948, Serial No. 33,875

1 Claim. (Cl. 257—129)

The present invention relates to automobile radiators and more particularly to the manner of connecting the radiator hoses thereto.

The principal objective of my invention is to provide a radiator having a hose fitting attached to the bottom tank thereof in a manner designed to improve the flow from the tank and out through the fitting.

Another object of my invention is to provide a fitting especially adapted to this main objective which can be made from the same kind of material as the material in the tank and of about the same wall thickness, so that expansion and contraction of all of the contacting parts will be about the same.

More particularly it is an object of my invention to provide a hose fitting so constructed and mounted upon the radiator tank that the area of communication between the fitting and the tank can be made larger than the area of the hose receiving tube and in which the opening into the tank is elongated and extends a substantial distance beyond one side of the hose receiving tube so that the tube may be located close to one end of the radiator tank and at the same time a smooth unimpeded flow out of the tank is assured.

A still further object of my invention is to provide a fitting of the character which is attractive, strong, efficient and easily manufactured at low cost.

To these and other useful ends my invention consists of parts, combinations of parts or their equivalents and method of manufacture and assembly as hereinafter described and claimed and shown in the accompanying drawings in which:

Fig. 1 is a transverse sectional view through the bottom portion of a radiator and its outlet fitting constructed in accordance with my invention.

Fig. 2 is a rear view of my improved fitting shown detached from the tank.

Fig. 3 is a top view of the fitting per se.

Fig. 4 is a side view of the fitting per se.

Fig. 5 is a rear view of one end portion of the lower header tank showing the location of the hole therein through which the tank and fitting are connected.

Fig. 6 is a bottom view of the same end portion of the tank, parts of said view being broken away and shown in cross section.

Referring now more particularly to the accompanying drawing, it will be seen that the lower tank of the radiator in its entirety is designated by reference character A, and that the hose fitting in its entirety is designated by reference character B. The tank A has a bottom wall 10 and a rear wall 11, preferably being at right angles to one another and join with end walls 8 and 9. A tube plate 12 suitably bonded to the rear wall 11, the end walls 8 and 9 and the front wall of the tank provides the top of the tank and has the lower ends of the usual radiator tubes 13 mounted therein. The tubes 13 are preferably flattened and have their long sides transverse to the header as shown in Figure 1, and as is customary the tubes are arranged in rows extending from one end wall of the tank to the other with the endmost tubes in each row close to the adjacent end wall of the tank. As is also customary the radiator tubes 13 have closely spaced fins 13' mounted thereon to provide extended surface.

The tank A has a hole therein extending across the junction of its bottom and rear walls 10 and 11 respectively and close to its end wall 8. The part 14 of this hole which is in the bottom wall of the tank is elongated, i. e. long and narrow, and extends along the junction of the bottom and rear walls from a point substantially in line with the radiator tubes nearest the end wall 8 of the tank towards the other end wall 9 a distance several times greater than its width. The other part 15 of the hole which is in the rear wall 11 of the tank may be of diminishing width as shown in Figure 5, with its widest portion joining the end of the part 14 nearest the tank wall 8.

The fitting B consists of two stampings 16 and 17, both preferably of the same metal and wall thickness as used for the tank A. These two stampings are secured together and as a unit are mounted on the tank A across the junction of its bottom and rear walls and over the hole therein. The stamping 16 has a shallow cup shaped configuration defined by an end wall 6 merging with a side wall 7, and has right angularly disposed flat flanges 18 and 19, the former extending from the edges of the end and side walls and the latter projecting from the side walls only. It will be noted that the side wall has an arcuate portion and straight end portions extending tangentially therefrom with one of said end portions perpendicular to the flange 18 and the other disposed at an acute angle to the flange 18.

The other stamping 17 consists of a cylindrical tube having an outwardly directed flat flange 26 encircling one extremity thereof. As best seen in Figure 2 the flange 26 has a lateral extension 26' projecting a substantial distance beyond one side of the tube; and the flange 26 with its extension is substantially normal to the axis of the tube.

The two stampings are secured together with their flanges 19 and 26 face to face, spot welds 28—28 being preferably employed to hold the parts together during this final bonding which may be done in any desired manner. When the stampings are secured together, the stamping 16 overlies the major portion of the flanged end of the tubular stamping 17 with the arcuate portion of its side wall 7 forming substantially a continuation of somewhat more than 90° of the tube side wall generally remote from its flange extension 26', and with the flange 18 of the stamping 16 extending across the end of the tube along a chordal plane which passes through the flange extension 26'. This construction provides the fitting with a shallow chamber having an elongated mouth coextensive in size and shape with the elongated part 14 of the hole in the tank A and extending or offset a substantial distance beyond one side of the tube 17.

The fitting B is mounted on the tank with its tube 17 close to the end wall 8 of the tank and with its area of communication with the tank extending a substantial distance towards the opposite end wall 9 of the tank. This assures smooth unimpeded flow from the tank out through the header. To effect such mounting the flange 26 on the tube 17 is bonded to the portion of the rear tank wall 11 bounding the part 15 of the hole therein and the flange 18 is bonded to the portion of the bottom tank wall 10 bounding the part 14 of the hole therein. To facilitate this assembly the flange 18 has rivet holes 20—20 and the flange 26 has rivet holes 27—27, both sets of holes being located to align with similar holes 20'—20' and 27'—27' in the bottom and rear tank walls respectively. Rivets (not shown) secured in these holes hold the fitting secure during its final bonding to the tank.

From the foregoing description taken together with the accompanying drawing it will be readily apparent to those skilled in this art that my invention greatly improves the modern automobile radiator by enabling the discharge hose to be located right near one end of the lower tank, and by enabling smooth unimpeded flow from the tank through the hose fitting.

Having thus shown and described my invention, I claim:

In an automobile radiator: a bottom header tank including opposite end walls and meeting bottom and rear walls disposed at substantially right angles to one another and joining the end walls, said tank also having a tube plate providing a top wall therefor and in which the lower ends of the radiator tubes are mounted in rows extending lengthwise of the tank with the endmost radiator tubes close to its end walls, said tank having a hole extending across the junction of its bottom and rear walls at one end of the tank with part of the hole in the bottom wall and the remainder thereof in the rear wall, the part of the hole in the bottom wall being elongated in the direction of the junction between the bottom and rear tank walls and extending from a point substantially in line with the radiator tubes nearest one end wall of the tank a distance toward the opposite end wall of the tank several times greater than said part of the hole extends forwardly from the rear tank wall, the remaining part of the hole which is in the rear wall of the tank having one end thereof meeting the end of the other elongated part of the hole nearest the adjacent end wall of the tank; a stamped metal radiator hose fitting comprising two complementary sheet metal stampings permanently joined together, one of said stampings consisting of a cylindrical hose receiving tube and an integral outwardly directed flat flange encircling one extremity thereof, said flange having a lateral extension projecting a substantial distance beyond one side of the tube, the other stamping overlying the major portion of the flanged end of the tube and having end and side walls cooperating with the flanged end of the tube to provide a chamber extending across the flanged end of the tube with a portion of said chamber defined partially by said flange extension disposed a substantial distance laterally beyond the adjacent side of the tube, said side wall being secured to the tube flange in edgewise abutting relationship and having an arcuate portion forming substantially a continuation of the tube wall at the side thereof remote from the lateral extension of the tube flange and continuing tangentially to substantially the extremity of said extension, the end wall merging with the side wall and overlying all but a small portion of the flanged end of the tube which lies to one side of a chordal plane of the tube and which plane passes through the extremity of the lateral extension on the tube flange, and an outwardly directed flat flange integrally joined to the end and side walls of said other stamping and lying in said chordal plane, the portions of said flange on the end wall abutting the tube flange and said two flanges being substantially perpendicular to one another; and means securing the fitting to the angularly disposed bottom and rear walls of the tank over the hole therein with the portion of the tube flange not covered by said other stamping lying flat against the portion of the rear wall bounding the part of the hole therein and the other flange lying flat against the portion of the bottom wall bounding the portion of the hole therein and with that portion of the end wall of said other stamping and the side of the tube of which it is substantially a continuation at the end of the hole nearest the adjacent end of the tank so that one side of the hose receiving tube is close to said end of the tank while the area of connection between the fitting and the tank extends a substantial distance beyond the opposite side of the tube towards the other end of the tank.

FRED M. YOUNG.

References Cited in the file of this patent

UNITED STATES PATENTS

| Number | Name | Date |
|---|---|---|
| 1,546,858 | Nathanson et al. | July 21, 1925 |
| 1,707,172 | Nathanson | Mar. 26, 1929 |